UNITED STATES PATENT OFFICE.

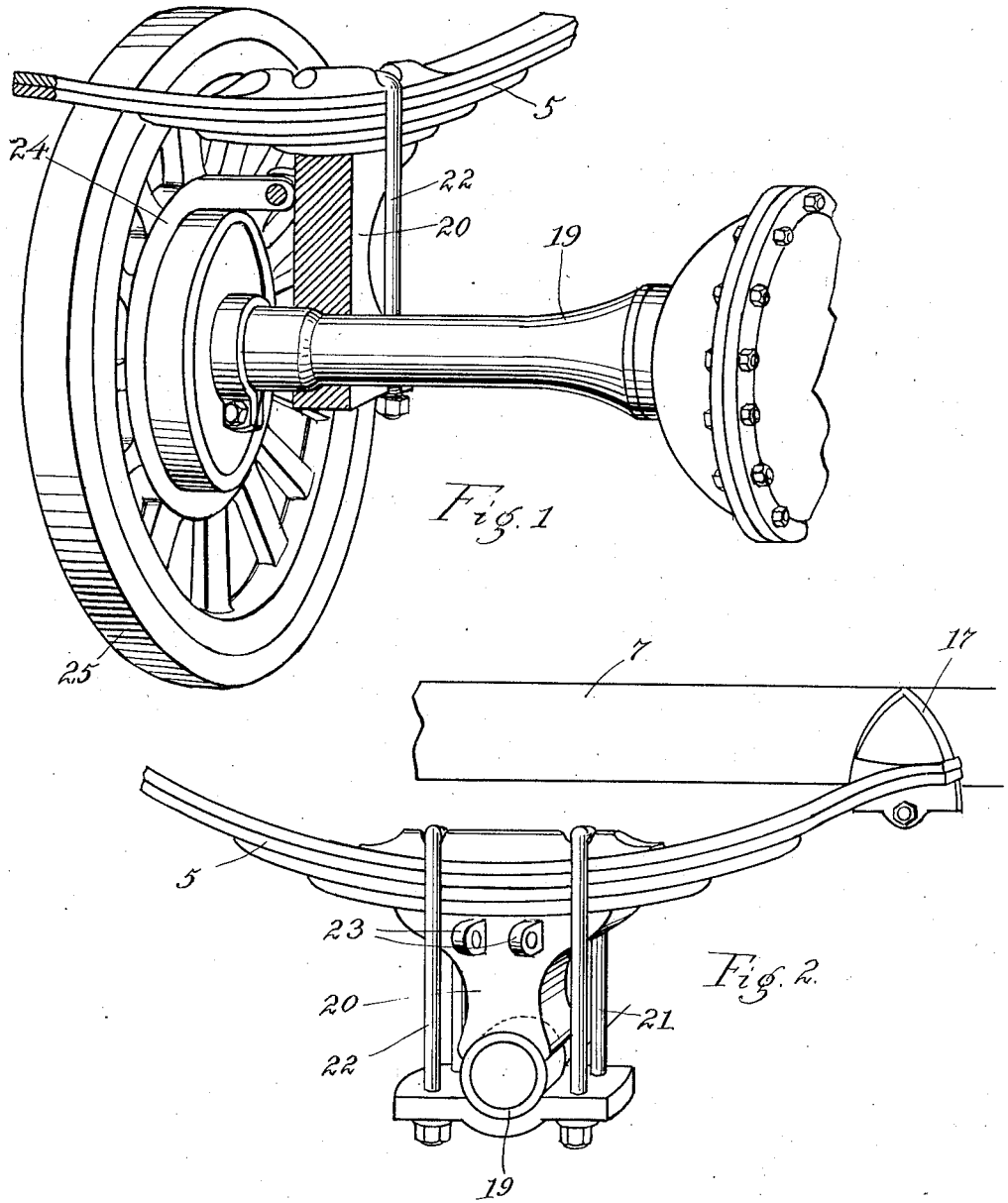

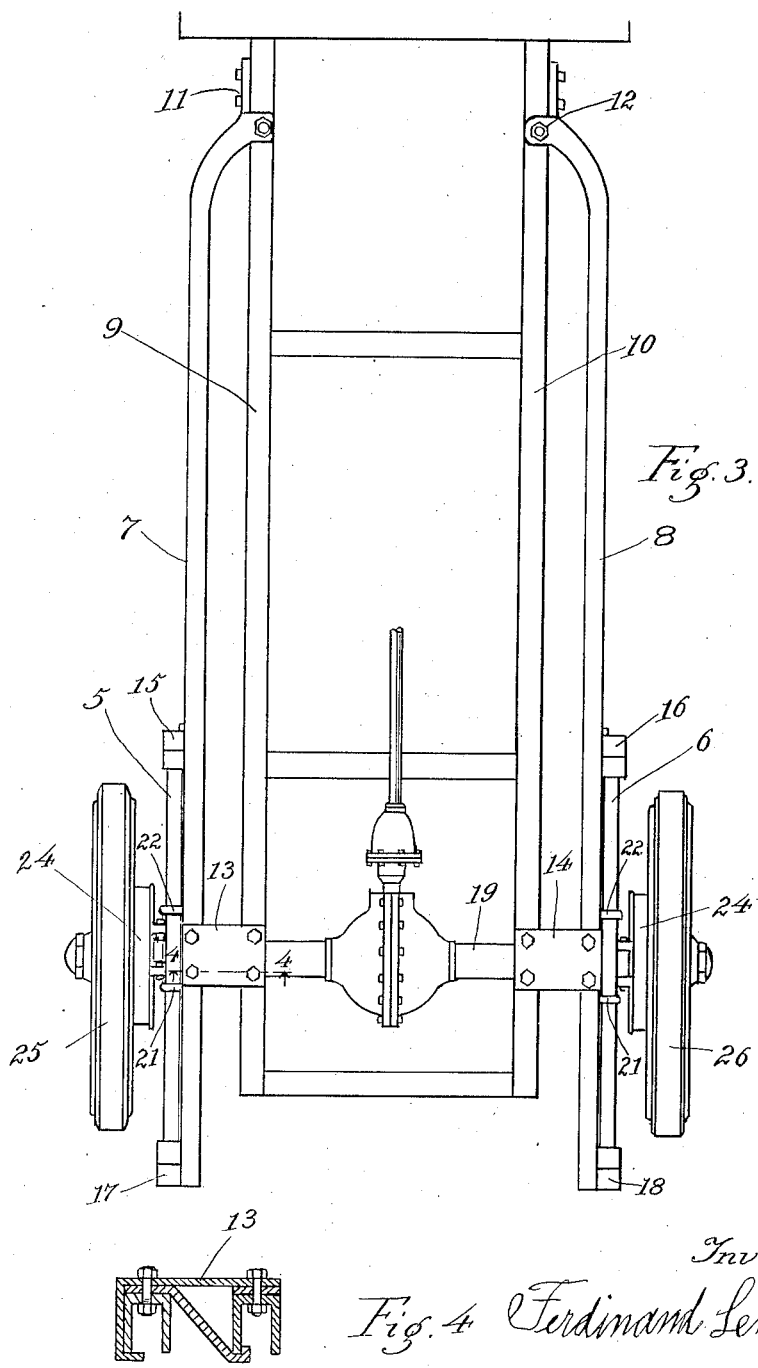

FERDINAND LENSER, OF CINCINNATI, OHIO.

DEVICE ADAPTING PASSENGER-AUTOMOBILES TO COMMERCIAL-TRUCK USE.

1,360,419.         Specification of Letters Patent.    Patented Nov. 30, 1920.

Application filed March 7, 1919. Serial No. 281,185.

*To all whom it may concern:*

Be it known that I, FERDINAND LENSER, a citizen of the United States, residing in Cincinnati, in the county of Hamilton and State of Ohio, have invented new and useful Improvements in Devices Adapting Passenger-Automobiles to Commercial-Truck Use, of which the following is a specification.

An object of my invention is to produce a means for converting passenger automobile chassis construction into a chassis construction of suitable design for commercial truck use.

A further object is to produce a device of the class described, in which the change from passenger to commercial construction may be accomplished with a minimum of labor, cost and time expenditure.

These and other objects are attained in the mechanism described in the following specification and illustrated in the accompanying drawing in which:—

Figure 1 is a fragmental sectional perspective view of a portion of the device embodying my invention.

Fig. 2 is a fragmental perspective view of the spring and mounting means forming a detail of the device embodying my invention.

Fig. 3 is a plan view of the converting device embodying my invention.

Fig. 4 is a sectional view of a detail of my invention taken on the line 4—4 of Fig. 3.

My invention consists in the elimination of the usual transversely extending spring at the rear of a certain type of motor vehicle now on the market and in the substitution therefor of a pair of longitudinally extending semi-elliptic springs 5 and 6 which are held in proper position by two longitudinally extending channel frame members 7 and 8.

At their forward ends the frame members 7 and 8 are attached to the regular channel frame members 9 and 10 of the existing passenger auto construction as shown at 11 and 12 and at their rear ends are connected with the existing channel frame members by plates 13 and 14 or other suitable connection.

Couplings 15 and 16 are secured to the auxiliary frame members 7 and 8 to connect the springs 5 and 6 therewith. At their rear ends the springs bear upon plates 17 and 18 which permit free action therewith. These springs are connected with the rear axle housing 19 by means of blocks 20 which are clamped rigidly therewith by clips 21 and 22 as shown in Fig. 2.

Lugs 23 are provided on each block 19 to facilitate the positioning and operation of the brake 24. In the truck equipment solid rubber tires 25 and 26 may be provided.

Having thus described my invention what I claim is:—

A device for converting passenger automobiles into commercial trucks, consisting of auxiliary frame members connected at their forward ends at points intermediate the ends of the existing chassis frame, located on each side thereof and having the upper surfaces of the auxiliary and existing chassis frames in the same horizontal plane, means adapted to connect the rear ends of the auxiliary members with the rear end of the chassis frame to have their upper surfaces in the same horizontal plane, longitudinally extending springs connected with the auxiliary frame members, means adapted to connect the springs with the existing rear axle housing of an automobile to be converted, said means consisting of a block having brake band retaining lugs thereon and located between each auxiliary spring and the end of the axle housing located adjacent thereto, blocks above and below the spring and axle housing respectively, and clips adapted to clamp the spring, the blocks and the axle housing together, and plates upon the auxiliary frame members adapted to permit sliding action of the ends of the vehicle springs therewith.

In witness whereof, I affix my signature in the presence of two witnesses.

FERDINAND LENSER.

Witnesses:
 MARIE LENSER,
 WILLIAM J. SCHULTZ.